United States Patent [19]

Pokhodnya et al.

[11] Patent Number: 4,950,331
[45] Date of Patent: Aug. 21, 1990

[54] CERAMIC FLUX FOR WELDING LOW-ALLOY STEELS

[76] Inventors: Igor K. Pokhodnya, ulitsa Chkalova, 41a, kv. 25; Daniil M. Kushnerev, ulitsa Vladimirskaya, 51/53, kv. 61; Sergei D. Ustinov, Lenina, 39, kv. 22, all of Kiev; Oleg G. Sokolov, prospekt Marshala Bljukhera, 57, korpus 1. kv. 194, Leningrad; Leonid V. Grischenko, ulitsa Gromova, 16, kv. 58, Leningrad; Gennady V. Baskakov, prospekt Slavy, 4. kv. 235, Leningrad; Marat V. Yamskoi, bulvar Trudyaschikhsya, 20, kv. 26, Leningrad, Kolpino; Andrei M. Zarubin, ulitsa Podlesnaya, 5/21, kv. 54; Viktor V. Golovko, Chekhovsky pereulok, 2, kv. 35, both of Kiev, all of U.S.S.R.

[21] Appl. No.: 378,168

[22] Filed: Jul. 11, 1989

[51] Int. Cl.$^5$ .................... C04B 35/00; B23K 35/34; C22B 4/00
[52] U.S. Cl. ...................... 106/313; 106/228; 148/24; 148/26; 75/10.53; 75/10.54
[58] Field of Search ............... 106/117, 118, 121, 136, 106/147, 153, 161, 313; 228/214; 148/26, 24; 75/10.53, 10.54

[56] References Cited

U.S. PATENT DOCUMENTS

| | | | |
|---|---|---|---|
| 2,671,040 | 3/1954 | Holmes | 106/313 |
| 2,681,875 | 6/1954 | Stringham et al. | 106/313 |
| 3,068,128 | 12/1962 | Shrubsall et al. | 106/313 |
| 3,627,592 | 12/1971 | Schmidt et al. | 106/313 |
| 3,798,078 | 3/1974 | Lettner et al. | 106/313 |
| 4,135,013 | 1/1979 | Yamaguchi et al. | 228/214 |

FOREIGN PATENT DOCUMENTS

| | | | |
|---|---|---|---|
| 212783 | 10/1956 | Australia | 106/313 |
| 942644 | 2/1974 | Canada | 106/313 |
| 135556 | 3/1960 | U.S.S.R. | 106/313 |
| 495177 | 4/1976 | U.S.S.R. | 228/214 |
| 1088904 | 4/1984 | U.S.S.R. | 228/224 |
| 1298029 | 3/1987 | U.S.S.R. | 228/224 |

OTHER PUBLICATIONS

N. Potapov and Lyubauskll, Weld Prod. (Great Britain) vol. 17, No. 7 (Jul. 1970) pp. 5–8 "Hydrogen in Submerged Arc Weld Metal".
Introduction To Ceramics Kingery, Bowen, Uhlmann 1976, p. 17 (ad various pages describing composition).

Primary Examiner—William R. Dixon, Jr.
Assistant Examiner—Paul Marcantoni
Attorney, Agent, or Firm—Burgess, Ryan & Wayne

[57] ABSTRACT

A ceramic flux for welding low-alloy steels contains calcined magnesite, synthetic slag containing two thirds of $CaF_2$ and one third of $Al_2O_3$, a component containing at least 95% of $Al_2O_3$ in the alpha form, wollastonite, marble, barium fluoride, ferrotitanium, ferroboron, sodium silicate.

The ratio of the total content of calcined magnesite, two thirds of synthetic slag and one half of wollastonite to the total content of the component containing at least 95% of $Al_2O_3$ in the alpha form, one third of synthetic slag, one half of woolastonite and two thirds of sodium silicate ranging from 1.30 to 1.43 and the ratio of titanium to boron ranging from 11.2 to 30.1.

3 Claims, No Drawings

CERAMIC FLUX FOR WELDING LOW-ALLOY STEELS

FIELD OF THE ART

The invention relates to welding materials, and in particular, it deals with ceramic fluxes for welding low-alloy steels to be used in offshore drilling rigs and in ships for operation at low temperatures.

Operating conditions impose especially stringent requirements upon weld metal in respect to both mechanical properties and content of diffused hydrogen.

STATE OF THE ART

Known in the art is a flux for welding low-alloy steels (SU, A, 1088904), comprising calcined magnesite, wollastonite, fluorspar, ferromanganese, silicocalcium, aluminium powder, aluminium dioxide and oxidizing components. The oxidizing components of the flux are in the form of ilmente concentrate and magnesium silicate. Aluminium dioxide is used in the ceramic flux as a component containing at least 90% of $Al_2O_3$ in the alpha form (technical corundum, highly calcined alumina). The components of the ceramic flux are used in the following proportioning, in % by weight.

| | |
|---|---|
| calcined magnesite | 25.0–35.0 |
| wollastonite | 12.0–24.0 |
| ilmenite concentrate | 4.0–12.0 |
| manganese silicate | 12.0–24.0 |
| fluorspar | 6.0–10.0 |
| ferromanganese | 0.4–2.3 |
| silicocalcium | 0.1–0.3 |
| aluminium powder | 0.1–0.8 |
| component containing at least 90% of $Al_2O_3$ in the alpha form | 15.0–25.0 |

In this ceramic flux, the total content of ilmenite and concentrate one half of magnesium silicate amount to 10-20%, the total content of ferromanganese, silicocalcium and aluminium powder amount to 1.5-2.5%, and the ratio of the total content of calcined magnesite, the component containing 90% of $Al_2O_3$ in the alpha form and one half of wollastonite to the content of fluorspar is 6.0-8.6.

However, the abovedescribed ceramic flux cannot ensure high impact strength of weld metal at low temperatures, and the presence of diffused hydrogen in weld metal produced using this flux contributes to the appearance of cold cracks especially in welding very thick steel members. The above problems do not allow reliability of welds at low temperatures to be ensured.

Also known in the art is a ceramic flux (SU, A, 1298029) for welding low-alloy steels, containing calcined magnesite, fluorspar, a component containing at least 95% of $Al_2O_3$ in the alpha form (technical corundum, highly calcined alumina), wollastonite, magnanese, sodium silicate, ferrotitanium and ferroboron with the following proportioning of the components, in % by weight:

| | |
|---|---|
| calcined magnesite | 23.0–31.0 |
| fluorspar | 24.0–27.0 |
| component containing at least 95% of $Al_2O_3$ in the alpha form | 18.0–27.0 |
| wollastonite | 11.0–18.0 |
| manganese | 0.9–1.8 |
| sodium silicate | 8.3–9.2 |
| ferrotitanium | 0.5–2.3 |
| ferroboron | 0.1–0.9 |

The ratio of the total content of calcined magnesite, fluorspar and one half of wollastonite to the total content of the component containing at least 95% of $Al_2O_3$ in the alpha form, one half of wollastonite and two thirds of sodium silicate ranges from 1.43 to 2.16 and the ratio of titanium to boron in the flux ranges from 4.23 to 17.1. This ceramic flux allows impact strength of weld metal at low temperatures to be slightly increased. However, diffused hydrogen content the weld metal remains at the same level.

Since these two characteristics—impact strength of weld metal at low temperatures and diffused hydrogen content in weld metal affect reliability in operation, an improvement of these characteristics will result in enhanced reliability of a welded joint operation.

SUMMARY OF THE INVENTION

It is an object of the invention to the reliability of a welded joint in operation by improving the impact strength of weld metal at low temperatures simultaneously with lowering of diffused hydrogen content in the weld metal.

This object is accomplished by a ceramic flux for welding low-alloy steels comprising synthetic slag, marble, barium fluoride and hematite with the following proportioning of the components, in % by weight:

| | |
|---|---|
| calcined magnesite | 20.0–30.0 |
| synthetic slag | 30.0–40.0 |
| component containing at least 95% of $Al_2O_3$ in the alpha form | 10.0–20.0 |
| wollastonite | 2.0–10.0 |
| marble | 1.0–5.0 |
| barium fluoride | 1.5–4.0 |
| hematite | 0.1–1.5 |
| ferrotitanium | 0.4–2.0 |
| ferroboron | 0.1–0.5 |
| manganese | 1.0–2.5 |
| sodium silicate | 7.0–10.0 |

The ratio of the total content of calcined magnesite, two thirds of synthetic slag and one half of wollastonite to the total content of the component containing at least 95% of $Al_2O_3$ in the alpha form, one third of synthetic slag, one half of wollastonite and two thirds of sodium silicate ranges from 1.30 to 1.45 and the ratio of titanium to boron ranges from 11.2 to 30.1 in this flux.

This ceramic flux allows reliability of a welded joint in operation to be enhanced by improving impact strength of the weld metal at low temperatures and lowering diffused hydrogen content in the weld metal. This is achieved owing to the use of synthetic slag constituting a slag-forming base of the ceramic flux with a high basicity, $SiO_2$ being available in the ceramic flux in the bonded form only so that its activity in the slag is lowered which contributes to enhanced impact strength of the weld metal at low temperatures. In addition, the presence of marble (calcium carbonate) and hematite in the ceramic flux allows cold cracking resistance of the weld metal to be improved owing to a lower content of diffused hydrogen in the weld metal. Barium fluoride makes it possible to use calcium carbonate and hematite without comprising process properties and also contributes to a lowering of $SiO_2$ activity in the slag.

Synthetic slag is in the form of two thirds of $CaF_2$ and one third of $Al_2O_3$. This contributes to high process performance of the flux.

It is preferred that the components of the ceramic flux be used in the following proportioning, in % by weight:

| | |
|---|---|
| calcined magnesite | 20.0–25.0 |
| synthetic slag | 33.0–40.0 |
| component containing at least 95% of $Al_2O_3$ in the alpha form | 13.0–20.0 |
| wollastonite | 2.0–6.0 |
| marble | 4.0–5.0 |
| barium fluoride | 3.0–4.0 |
| hematite | 0.6–1.5 |
| ferrotitanium | 0.5–1.0 |
| ferroboron | 0.3–0.5 |
| manganese | 1.0–2.0 |
| sodium silicate | 7.0–10.0 |

This composition makes it possible to produce weld metal with a minimum content of diffused hydrogen with a high enough impact strength at low temperatures.

It is also preferred that the components of the ceramic flux be used in the following proportioning, in % by weight:

| | |
|---|---|
| calcined magnesite | 25.0–30.0 |
| synthetic slag | 30.0–40.0 |
| component containing at least 95% of $Al_2O_3$ in the alpha form | 10.0–20.0 |
| wollastonite | 3.0–8.0 |
| marble | 2.0–3.0 |
| barium fluoride | 1.5–4.0 |
| hematite | 0.1–0.5 |
| ferrotitanium | 0.4–0.6 |
| ferroboron | 0.1–0.2 |
| manganese | 1.5–2.0 |
| sodium silicate | 7.0–10.0 |

The ratio of the content of calcined magnesite, two thirds of synthetic slag and one half of wollastonite to the total content of the component containing at least 95% of $Al_2O_3$ in the alpha form, one third of synthetic slag, one half of wollastonite and two thirds of sodium silicate ranges from 1.40 to 1.45 and the ratio of titanium to boron ranges from 13.0 to 18.0.

This composition makes it possible to ensure high impact strength at low temperature with a low enough content of diffused hydrogen in weld metal.

PREFERRED EMBODIMENT

The ceramic flux is prepared in the following manner. Starting lump materials for preparing the ceramic flux (calcined magnesite, hematite, wollastonite, synthetic slag consisting of two thirds of $CaF_2$ and one third of $Al_2O_3$, manganese, ferrotitanium, ferroboron) are crushed in a jaw and/or roll crusher, comminuted in ball mills and sieved through a sieve with 0.2 mm mesh (mineral ore components) and 0.25 mm mesh (metal components).

Pulverulent materials (the component containing at least 95% of $Al_2O_3$ in the alpha form, barium fluoride) are only subjected to control sieving through a sieve with 0.2 mm mesh size. Moisture content of the components fed for grinding or weighing should not exceed 0.1%. The material should be dried to this moisture content if its moisture content value is greater.

The components are weighed with 0.1% accuracy. The mass of one batch of flux should not exceed 200 kg.

The weighed batch is homogenized, moistened with a binder—aqueous solution of sodium silicate (soluble water glass with a density from 14.2 to 14.5 $N/m^3$) and pelletized. All these operations are carried out in succession in one and the same unit in the form of a countercurrent mixer and pelletizer of the intensive type. A disk pelletizer may also be used, but dry batch should be preliminarily homogenized in a double-cone or other mixer.

After the pelletization, the ceramic flux is dried at 250°–300° C. for 30–40 minutes and calcined at 650°+20° C. for 40 to 60 minutes. Rotary drum kilns are used for heat treatment of the flux.

The flux is cooled after the calcination in an air-water cooler whereafter the ceramic flux may be used for welding.

The ceramic flux prepared as described above was used for producing welded joints of steel containing in %: C 0.1; Si 0.2; Mn 0.6; Cr 1.05; Ni 1.8; Mo 0.18; V 0.05; Cu 0.55; S 0.012; P 0.018 40 mm thick using a low-alloy steel containing in %: C 0.08; Si 0.15; Mn 1.4; Cr 0.06; Ni 1.2; Mo 0.45; Cu 0.57; Ti 0.08; S 0.016; P 0.020. Welding conditions: welding current 500–600 A, arc voltage 26–32 V, welding speed 22 m/h. Inverted polarity d-c welding current was used.

Metallographic investigations carried out with the aid of ISM 35CF electron raster microscope and X-ray "Lino 860" microanalyzer showed that in welding the abovedescribed steel under the ceramic flux according to the invention using the abovedescribed wire the weld metal structure was homogeneous and fine-grained.

It was mainly in the form of acicular ferrite and carbides of the abovementioned metals. Ferrite needles were very fine (maximum 5 μm long and up to 1 μm thick). Proeutectoid ferrite content in the weld metal structure did not exceed 0.5% and there were no inclusions of $Al_2O_3$. Non-metal inclusions were in the form of titanium-containing manganese aluminosilicates. They are finely divided (from 0.1 to 0.5 μm), rounded and are uniformly distributed within the structure. In many cases these inclusions are located at the origin of ferrite needles. Chromium, nickel and other alloying elements are in solid ferrite solution. Various embodiments of ceramic flux and results of tests of welded joints produced with these fluxes will be given below by way of example.

EXAMPLE 1

Ceramic flux contained the components in the following proportioning, in % by weight:

| | |
|---|---|
| calcined magnesite | 23.0 |
| synthetic slag | 35.0 |
| component containing at least 95% of $Al_2O_3$ in the alpha form | 17.5 |
| wollastonite | 8.0 |
| marble | 2.5 |
| barium fluoride | 3.0 |
| hematite | 0.7 |
| ferrotitanium | 0.6 |
| ferroboron | 0.2 |
| manganese | 1.5 |
| sodium silicate | 8.0 |

The ratio of the total content of calcined magnesite two thirds of synthetic slag, one half of wollastonite to the total content of the component containing at least 95% of $Al_2O_3$ in the alpha form (technical corundum), one third of synthetic slag, one half of wollastonite and two thirds of sodium silicate was 1.31 and the titanium-to-boron ratio was 11.2.

The following properties were determined for welded joints produced using this flux:

KCV, $J/cm^2$—impact strength at $-60°$ C. by the IIW-DOC XII666-77 technique recommended by the International Welding Institute;

$\sigma_{02}$, $N/mm^2$—yield limit of weld metal;

$\sigma_B$, $N/mm^2$—ultimate strength of weld metal;

$\delta_5$, %—relative elongation at rupture;

$\psi$, %—relative constriction at rupture;

content of diffused hydrogen in weld metal, $cm^3/100$ g.

Weld shaping and separation of slag crust were also assessed. Weld metal was tested in at least three samples. The test results are given in the Table below.

In column 2 of the Table, where impact strength results are given, the numerator is for minimum and maximum values of impact strength and the denominator is for the mean value of impact strength for a ceramic flux of a given composition.

EXAMPLE 2

Ceramic flux contained the components in the following proportioning, in % by weight:

| calcined magnesite | 30.0 |
|---|---|
| synthetic slag | 30.0 |
| component containing at least 95% of $Al_2O_3$ in the alpha form | 17.2 |
| wollastonite | 3.0 |
| marble | 4.0 |
| barium fluoride | 4.0 |
| hematite | 0.7 |
| ferrotitanium | 0.6 |
| ferroboron | 0.2 |
| manganese | 1.0 |
| sodium silicate | 9.0 |

The ratio of the total content of calcined magnesite, two thirds of synthetic slag, one half of wollastonite to the total content of the component containing at least 95% of $Al_2O_3$ in the alpha form (technical corundum), one third of synthetic slag, one half of wollastonite and two thirds of sodium silicate was 1.30 and the titanium-to-boron ratio was 11.2.

The characteristics listed in Example 1 were tested for welded joints.

The test results are given in the Table below.

EXAMPLE 3

Ceramic flux contained the components in the following proportioning, in % by weight:

| calcined magnesite | 23.5 |
|---|---|
| syntehtic slag | 40.0 |
| component containing at least 95% of $Al_2O_3$ in the alpha form | 20.3 |
| wollastonite | 2.7 |
| marble | 1.0 |
| barium fluoride | 1.5 |
| hematite | 1.5 |
| ferrotitanium | 0.6 |
| ferroboron | 0.2 |
| manganese | 1.7 |
| sodium silicate | 7.0 |

The ratio of the total content of calcined magnesite, two thirds of synthetic slag, one half of wollastonite to the total content of the component containing at least 95% of $Al_2O_3$ in the alpha form (technical corundum), one third of synthetic slag, one half of wollastonite and two thirds of sodium silicate was 1.30 and the titanium-to-boron ratio was 11.2.

The characteristics listed in Example 1 were tested for welded joints. The test results are given in the Table below.

EXAMPLE 4

Ceramic flux contained the components in the following proportions, in % by weight:

| calcined magnesite | 23.9 |
|---|---|
| synthetic slag | 35.0 |
| component containing at least 95% of $Al_2O_3$ in the alpha form | 15.0 |
| wollastonite | 6.0 |
| marble | 5.0 |
| barium fluoride | 1.5 |
| hematite | 1.5 |
| ferrotitanium | 0.5 |
| ferroboron | 0.1 |
| manganese | 1.5 |
| sodium silicate | 10.0 |

The ratio of the total content of calcined magnesite, two thirds of synthetic slag, one half of wollastonite to the total content of the component containing at least 95% of $Al_2O_3$ in the alpha form (technical corundum), one third of synthetic slag, one half of wollastonite and two thirds of sodium silicate was 1.38 and the titanium-to-boron ratio was 16.7.

The characteristics listed in Example 1 were tested for welded joints.

The test results are given in the Table below.

EXAMPLE 5

Ceramic flux contained the components in the following proportioning, in % by weight:

| calcined magnesite | 30.0 |
|---|---|
| synthetic slag | 30.0 |
| component containing at least 95% of $Al_2O_3$ in the alpha form | 20.0 |
| wollastonite | 2.0 |
| marble | 1.0 |
| barium fluoride | 3.0 |
| hematite | 1.3 |
| ferrotitanium | 0.5 |
| ferroboron | 0.1 |
| manganese | 2.1 |
| sodium silicate | 10.0 |

The ratio of the total content of calcined magnesite, two thirds of synthetic slag, one half of wollastonite to the total content of the component containing at least 95% of $Al_2O_3$ in the alpha form (technical corundum), one third of synthetic slag, one half of wollastonite and two thirds of sodium silicate was 1.35 and the titanium-to-boron ratio was 16.7.

The characteristics listed in Example 1 were tested for welded joints.

The test results are given in the Table below.

EXAMPLE 6

Ceramic flux contained the components in the following proportions, in % by weight:

| | |
|---|---|
| calcined magnesite | 20.0 |
| synthetic slag | 40.0 |
| component containing at least 95% of Al$_2$O$_3$ in the alpha form | 13.3 |
| wollastonite | 6.0 |
| marble | 3.0 |
| barium fluoride | 4.0 |
| hematite | 1.1 |
| ferrotitanium | 0.5 |
| ferroboron | 0.1 |
| manganese | 2.0 |
| sodium silicate | 10.0 |

The ratio of the total content of calcined magnesite, two thirds of synthetic slag, one half of wollastonite to the total content of the component containing at least 95% of Al$_2$O$_3$ in the alpha form (highly calcined alumina)*, one third of synthetic slag, one half of wollastonite and two thirds of sodium silicate was 1.37 and the titanium-to-boron ratio was 16.7.

*Alumina calcined at at least 1400° C. for at least four hours.

The characteristics listed in Example 1 were tested for welded joints.

The test results are given in the Table below.

EXAMPLE 7

Ceramic flux containing the components in the following proportions, in % by weight:

| | |
|---|---|
| calcined magnesite | 24.8 |
| synthetic slag | 35.6 |
| component containing at least 95% of Al$_2$O$_3$ in the alpha form | 15.0 |
| wollastonite | 7.1 |
| marble | 2.5 |
| barium fluoride | 3.0 |
| hematite | 1.0 |
| ferrotitanium | 0.9 |
| ferroboron | 0.1 |
| manganese | 1.3 |
| sodium silicate | 8.7 |

The ratio of the total content of calcined magnesite, two thirds of synthetic slag, one half of wollastonite to the total content of the component containing at least 95% of Al$_2$O$_3$ in the alpha form (highly-calcined alumina), one third of synthetic slag, one half of wollastonite and two thirds of sodium silicate was 1.44 and the titanium-to-boron ratio was 30.1.

The characteristics listed in Example 1 were tested for welded joints.

The test results are given in the Table below.

EXAMPLE 8

Ceramic flux containing the components in the following proportions in % by weight:

| | |
|---|---|
| calcined magnesite | 20.0 |
| synthetic slag | 40.0 |
| component containing at least 95% of Al$_2$O$_3$ in the alpha form | 11.6 |
| wollastonite | 8.0 |
| marble | 4.0 |
| barium fluoride | 4.0 |
| hematite | 0.1 |
| ferrotitanium | 0.9 |
| ferroborn | 0.1 |
| manganese | 1.3 |
| sodium silicate | 10.0 |

The ratio of the total content of calcinated magnesite, two thirds of synthetic slag, one half of wollastonite to the total content of the component containing at least 95% of Al$_2$O$_3$ in the alpha form (technical corundum), one third of synthetic slag, one half of wollastonite and two thirds of sodium silicate was 1.42 and the titanium-to-boron ratio was 30.1.

The characteristics listed in Example 1 were tested for welded joints.

The test results are given in the Table below.

EXAMPLE 9

Ceramic flux contained the components in the following proportioning, in % by weight:

| | |
|---|---|
| calcined magnesite | 30.0 |
| synthetic slag | 30.0 |
| component containing at least 95% of Al$_2$O$_3$ in the alpha form | 20.0 |
| wollastonite | 4.0 |
| marble | 1.0 |
| barium fluoride | 1.5 |
| hematite | 0.5 |
| ferrotitanium | 1.5 |
| ferroboron | 0.17 |
| manganese | 2.5 |
| sodium silicate | 7.83 |

The ratio of the total content of calcined magnesite, two thirds of synthetic slag, one half of wollastonite to the total content of the component containing at least 95% of Al$_2$O$_3$ in the alpha form (technical corundum), one third of synthetic slag, one half of wollastonite and two thirds of sodium silicate was 1.40 and the titanium-to-boron ratio was 29.6.

The characteristics listed in Example 1 were tested for welded joints.

The test results are given in the Table below.

EXAMPLE 10

Ceramic flux contained the components in the following proportions, in % by weight:

| | |
|---|---|
| calcined magnesite | 24.0 |
| synthetic slag | 36.0 |
| component containing at least 95% of Al$_2$O$_3$ in the alpha form | 19.5 |
| wollastonite | 2.0 |
| marble | 5.0 |
| barium fluoride | 3.2 |
| hematite | 1.0 |
| ferrotitanium | 1.0 |
| ferroboron | 0.3 |
| manganese | 1.0 |
| sodium silicate | 7.0 |

The ratio of the total content of calcined magnesite, two thirds of synthetic slag, one half of wollastonite to the total content of the component containing at least 95% of Al$_2$O$_3$ in the alpha form, one third of synthetic slag, one half of wollastonite and two thirds of sodium silicate was 1.32 and the titanium-to-boron ratio was 11.2.

The characteristics listed in Example 1 were tested for welded joints.

The test results are given in the Table below.

EXAMPLE 11

Ceramic flux contained the components in the following proportions, in % by weight:

| | |
|---|---|
| calcined magnesite | 29.0 |
| synthetic slag | 30.0 |
| component containing at least 95% of Al$_2$O$_3$ in the alpha form | 19.0 |
| wollastonite | 7.0 |
| marble | 2.0 |
| barium fluoride | 3.3 |
| hematite | 0.5 |
| ferrotitanium | 0.6 |
| ferroboron | 0.1 |
| manganese | 0.5 |
| sodium silicate | 7.0. |

The ratio of the total content of calcined magnesite, two thirds of synthetic slag, one half of wollastonite to the total content of the component containing at least 95% of Al$_2$O$_3$ in the alpha form (technical corundum), one third of synthetic slag, one half of wollastonite and two thirds of sodium silicate was 1.44 and the titanium-to-boron ratio was 17.0.

The characteristics listed in Example 1 were tested for welded joints.

The test results are given in the Table below.

EXAMPLE 12 (COMPARATIVE)

Ceramic flux contained the components in the following proportions, in % by weight:

| | |
|---|---|
| calcined magnesite | 20.0 |
| synthetic slag | 39.0 |
| component containing at least 95% of Al$_2$O$_3$ in the alpha form | 20.0 |
| wollastonite | 2.0 |
| marble | 3.5 |
| barium fluoride | 4.0 |
| hematite | 0.1 |
| ferrotitanium | 0.3 |
| ferroboron | 0.1 |
| manganese | 1.0 |
| sodium silicate | 10.0. |

The ratio of the total content of calcined magnesite, two thirds of synthetic slag, one half of wollastonite to the total content of the component containing at least 95% of Al$_2$O$_3$ in the alpha form (technical corundum), one third of synthetic slag, one half of wollastonite and two thirds of sodium silicate was 1.44 and the titanium-to-boron ratio was 17.0.

The characteristics listed in Example 1 were tested for welded joints.

The test results are given in the Table below.

EXAMPLE 13 (COMPARATIVE)

Ceramic flux contained the components in the following proportions, in % by weight:

| | |
|---|---|
| calcined magnesite | 20.0 |
| synthetic slag | 30.0 |
| component containin at least 95% of Al$_2$O$_3$ in the alpha form | 20.0 |
| wollastonite | 10.0 |
| marble | 3.0 |
| barium fluoride | 3.0 |
| hematite | 1.6 |
| ferrotitanium | 0.3 |
| ferroboron | 0.1 |
| manganese | 2.0 |
| sodium silicate | 10.0. |

The ratio of the total content of calcined magnesite, two thirds of synthetic slag, one half wollastonite to the total content of the component containing at least 95% of Al$_2$O$_3$ in the alpha form (highly-calcined alumina), one third of synthetic slag, one half of wollastonite and two thirds of sodium silicate was 1.07 and the titanium-to-boron ratio was 10.05.

The characteristics listed in Example 1 were tested for welded joints.

The test results are given in the Table below.

EXAMPLE 14 (COMPARATIVE)

Ceramic flux containing the components in the following proportions, in % by weight:

| | |
|---|---|
| calcined magnesite | 20.0 |
| synthetic slag | 36.0 |
| component containing at least 95% of Al$_2$O$_3$ in the alpha form | 12.0 |
| wollastonite | 8.0 |
| marble | 1.5 |
| barium fluoride | 3.0 |
| hematite | 0.9 |
| ferrotitanium | 1.9 |
| ferroboron | 0.2 |
| manganese | 1.0 |
| sodium silicate | 7.5. |

The ratio of the total content of calcined magnesite, two thirds of synthetic slag, one half of wollastonite to the total content of the component containing at least 95% of Al$_2$O$_3$ in the alpha form (technical corundum), one third of synthetic slag, one half of wollastonite and two thirds of sodium silicate was 1.70 and the titanium-to-boron ratio was 33.0.

The characteristics listed in Example 1 were tested for welded joints.

The test results are given in the Table below.

EXAMPLE 15 (COMPARATIVE)

Ceramic flux contained the components in the following proportions, in % by weight:

| | |
|---|---|
| calcined magnesite | 28.0 |
| synthetic slag | 36.0 |
| component containing at least 95% of Al$_2$O$_3$ in the alpha form | 12.0 |
| wollastonite | 8.0 |
| marble | 1.5 |
| barium fluoride | 3.0 |
| hematite | 0.9 |
| ferrotitanum | 1.9 |
| ferroboron | 0.2 |
| manganese | 1.0 |
| sodium silicate | 7.5 |

The ratio of the total content of calcined magnesite, two thirds of synthetic slag, one half of wollastonite to the total content of the component containing at least 95% of Al$_2$O$_3$ in the alpha form (technical corundum), one third of synthetic slag, one half of wollastonite and two thirds of sodium silicate was 1.70 and the titanium-to-boron ratio was 33.0.

The characteristics listed in Example 1 were tested for welded joints.

The test results are given in the Table below.

EXAMPLE 16 (COMPARATIVE)

Ceramic flux contained the components in the following proportions, in % by weight:

| calcined magnesite | 23.0 |
| synthetic slag | 40.0 |
| component containing at least 95% of Al$_2$O$_3$ in the alpha form | 10.0 |
| wollastonite | 8.0 |
| marble | 1.0 |
| barium fluoride | 2.35 |
| hematite | 1.5 |
| ferrotitanium | 1.5 |
| ferroboron | 0.15 |
| mananese | 2.5. |
| sodium silicate | 10.0. | p The ratio of the total content of calcined magnesite, two thirds of synthetic slag, one half of wollastonite to the total content of the component containing at least 95% of Al$_2$O$_3$ in the alpha form (technical corundum), one third of synthetic slag, one half of wollastonite and two thirds of sodium silicate was 1.57 and the titanium-to-boron ratio was 33.5.

The characteristics listed in Example 1 were tested for welded joints.

The test results are given in the Table below.

EXAMPLE 17 (COMPARATIVE)

Ceramic flux contained the components in the following proportions, in % by weight:

| calcined magnesite | 30.0 |
| synthetic slag | 30.0 |
| components containing at least 95% of Al$_2$O$_3$ in the alpha form | 15.0 |
| wollastonite | 4.0 |
| marble | 4.0 |
| barium fluoride | 1.5 |
| hematite | 0.1 |
| ferrotitanium | 2.0 |
| ferroboron | 2.5 |
| manganese | 1.9 |
| sodium silicate | 9.0. |

The ratio of the total content of calcined magnesite, two thirds of synthetic slag, one half of wollastonite to the total content of the component containing at least 95% of Al$_2$O$_3$ in the alpha form (technical corundum), one third of synthetic slag, one half of wollastonite and two thirds of sodium silicate was 1.57 and the titanium-to-boron ratio was 34.0.

The characteristics listed in Example 1 were tested for welded joints.

The test results are given in the Table below.

EXAMPLE 18 (COMPARATIVE)

Ceramic flux contained the components in the following proportions, in % by weight:

| calcined magnesite | 32.0 |
| synthetic slag | 25.0 |
| component containing at least 95% of Al$_2$O$_3$ in the alpha form | 22.0 |
| wollastonite | 8.0 |
| marble | 0.5 |
| barium fluoride | 1.0 |
| hematite | 0.4 |
| ferrotitanium | 0.5 |
| ferroboron | 0.1 |
| manganese | 2.5 |
| sodium silicate | 8.0. |

The ratio of the total content of calcined magnesite, two thirds of synthetic slag, one half of wollastonite to the total content of the component containing at least 95% of Al$_2$O$_3$ in the alpha form (technical corundum), one third of synthetic slag, one half of wollastonite and two thirds of sodium silicate was 1.33 and the titanium-to-boron ratio was 16.7.

The characteristics listed in Example 1 were tested for welded joints.

The test results are given in the Table below.

EXAMPLE 19 (COMPARATIVE)

Ceramic flux contained the components in the following proportions, in % by weight:

| calcined magnesite | 17.0 |
| synthetic slag | 43.0 |
| components containing at least 95% of Al$_2$O$_3$ in the alpha form | 10.4 |
| wollastonite | 6.0 |
| marble | 6.0 |
| barium fluoride | 4.5 |
| hematite | 2.0 |
| ferrotitanium | 0.5 |
| ferroboron | 0.1 |
| manganese | 0.5 |
| sodium silicate | 10.0. |

The ratio of the total content of calcined magnesite, two thirds of synthetic slag, one half of wollastonite to the total content of the component containing at least 95% of Al$_2$O$_3$ in the alpha form (technical corundum) one third of synthetic slag, one half of wollastonite and two thirds of sodium silicate was 1.41 and the titanium-to-boron ratio was 16.7.

The characteristics listed in Example 1 were tested for welded joints.

The test results are given in the Table below.

EXAMPLE 20

Ceramic flux according to SU, A, 1298029 contained the components in the following proportions, in % by weight:

| calcined magnesite | 28.0 |
| fluorspar | 25.0 |
| technical corundum | 20.0 |
| wollastonite | 15.0 |
| manganese | 1.2 |
| sodium silicate | 9.0 |
| ferrotitanium | 1.5 |
| ferroboron | 0.3. |

The ratio of the total content of calcined magnesite, fluorspar and one half of wollastonite to the total content of electrical corundum, one half of wollastonite and two thirds of sodium silicate was 1.8, and the titanium-to-boron ratio was 16.16.

This ceramic flux was used for welding steels using the low-alloy wire having the abovementioned compositions.

The characteristics listed in Example 1 were tested for welded joints. The test results are given in the Table below.

TABLE

| No. of Example 1 | KOV,J/cm² at −60° C. 2 | $\sigma_{02}$ N/mm² 3 | $\sigma_B$ N/mm² 4 | $\delta_5$ % 5 | $\Psi$ % 6 | Diffusion hydrogen content in weld metal cm³/100 g 7 | Weld shaping assessment 8 | Slag crust separation 9 |
|---|---|---|---|---|---|---|---|---|
| 1 | 64–79 / 72.8 | 682 | 790 | 21 | 60 | 1.2 | good | easy |
| 2 | 62–83 / 77.1 | 679 | 784 | 20 | 63 | 1.0 | " | " |
| 3 | 66–80 / 76.7 | 680 | 789 | 21 | 60 | 3.1 | " | " |
| 4 | 69–89 / 74.8 | 710 | 809 | 20 | 61 | 1.0 | fair | " |
| 5 | 68–92 / 77.1 | 701 | 805 | 22 | 62 | 3.2 | good | " |
| 6 | 67–101 / 81.2 | 712 | 807 | 20 | 60 | 1.2 | " | " |
| 7 | 61–79 / 72.4 | 698 | 799 | 21 | 61 | 1.7 | " | " |
| 8 | 62–88 / 74.6 | 684 | 790 | 22 | 60 | 1.0 | " | " |
| 9 | 60–74 / 68.1 | 705 | 812 | 20 | 58 | 3.2 | " | " |
| 10 | 60–87 / 74.2 | 680 | 773 | 21 | 62 | 0.8 | " | " |
| 11 | 81–108 / 98.6 | 675 | 780 | 23 | 65 | 2.4 | good | easy |
| 12 | 34–67 / 42.0 | 689 | 791 | 21 | 62 | 1.1 | " | " |
| 13 | 38–80 / 54.2 | 680 | 769 | 21 | 63 | 1.2 | " | " |
| 14 | 42–78 / 56.8 | 636 | 726 | 23 | 66 | 1.0 | fair | hampered |
| 15 | 41–96 / 58.2 | 642 | 738 | 23 | 64 | 2.9 | bad | " |
| 16 | 47–62 / 53.1 | 724 | 812 | 20 | 60 | 3.0 | fair | " |
| 17 | 16–31 / 24.7 | 710 | 804 | 19 | 59 | 1.0 | bad | " |
| 18 | 79–115 / 90.3 | 704 | 810 | 20 | 60 | 3.4 | good | easy |
| 19 | 61–80 / 71.6 | 690 | 782 | 21 | 63 | 0.9 | fair | hampered |
| 20 | 15–45 / 32.4 | 601 | 690 | 23 | 57 | 4.5 | good | easy |

It will be apparent that only certain examples of the invention are given above. Other embodiments are possible without going beyond the spirit and scope of the invention as defined in the appended claims.

We claim:

1. A ceramic flux for welding low-alloy steels, comprising: calcined magnesite, synthetic slag, containing two thirds of $CaF_2$ and one third of $Al_2O_3$, a component containing at least 95% of $Al_2O_3$ in the alpha form, wollastonite, calcium carbonate, barium fluoride, hematite, ferrotitanium, ferroboron, manganese, sodium silicate in the following proportions of the components, in % by weight:

| | |
|---|---|
| calcined magnesite | 20.0–30.0 |
| synthetic slag | 30.0–40.0 |
| component containing at least 95% of $Al_2O_3$ in the alpha form | 10.0–20.0 |
| wollastonite | 2.0–10.0 |
| calcium carbonate | 1.0–5.0 |
| barium fluoride | 1.5–4.0 |
| hematite | 0.1–5.0 |
| ferrotitanium | 0.4–2.0 |
| ferroboron | 0.1–0.5 |
| manganese | 1.0–2.5 |
| sodium silicate | 7.0–10.0, | the ratio of the total content of calcined magnesite, two thirds of synthetic slag and one half of wallastonite to the total content of the component containing at least 95% of $Al_2O_3$ in the alpha form, one third of synthetic slag, one half of wollastonite and two thirds of sodium silicate ranging from 1.30 to 1.45, and the ratio of titanium to boron ranging from 11.2 to 30.1.

2. A ceramic flux according to claim 1, containing the components in the following proportions, in % by weight:

| | |
|---|---|
| calcined magnesite | 20.0–25.0 |

| -continued | |
|---|---|
| synthetic slag | 33.0–40.0 |
| component containing at least 95% of Al$_2$O$_3$ in the alpha form | 13.0–20.0 |
| wollastonite | 2.0–6.0 |
| calcium carbonate | 4.0–5.0 |
| barium fluoride | 3.0–4.0 |
| hematite | 0.6–1.5 |
| ferrotitanium | 0.5–1.0 |
| ferroboron | 0.3–1.5 |
| manganese | 1.0–2.0 |
| sodium silicate | 7.0–10.0. |

3. A ceramic flux according to claim 1, containing the components in the following proportions in % by weight:

| | |
|---|---|
| calcined magnesite | 25.0–30.0 |
| synthetic slag | 30.0–40.0 |
| component containing at least 95% of Al$_2$O$_3$ in the alpha form | 10.0–20.0 |
| wollastonite | 3.0–8.0 |
| calcium carbonate | 2.0–3.0 |
| barium fluoride | 1.5–4.0 |
| hamatite | 0.1–0.5 |
| ferrotitanium | 0.4–0.6 |
| ferroboron | 0.1–0.2 |
| manganese | 1.5–2.0 |
| sodium silicate | 7.0–10.0, | the ratio of the content of calcined magnesite, two thirds of synthetic slag and one half of wollastonite to the total content of the component containing 95% of Al$_2$O$_3$ in the alpha form, one third of synthetic slag, one half of wollastonite and two thirds of sodium silicate ranging from 1.40 to 1.45, and the ratio of titanium to boron ranging from 13.0 to 18.0.

* * * * *